(12) United States Patent
Tango

(10) Patent No.: US 12,346,085 B2
(45) Date of Patent: Jul. 1, 2025

(54) MACHINE TOOL

(71) Applicant: FANUC CORPORATION, Yamanashi (JP)

(72) Inventor: Chikara Tango, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 406 days.

(21) Appl. No.: 17/918,596

(22) PCT Filed: Apr. 12, 2021

(86) PCT No.: PCT/JP2021/015113
§ 371 (c)(1),
(2) Date: Oct. 13, 2022

(87) PCT Pub. No.: WO2021/210521
PCT Pub. Date: Oct. 21, 2021

(65) Prior Publication Data
US 2023/0143864 A1    May 11, 2023

(30) Foreign Application Priority Data
Apr. 17, 2020   (JP) ................................. 2020-073862

(51) Int. Cl.
*G05B 19/402* (2006.01)
(52) U.S. Cl.
CPC .. *G05B 19/402* (2013.01); *G05B 2219/49178* (2013.01)
(58) Field of Classification Search
CPC ...... G05B 19/401; G05B 19/18; G05B 19/04; G05B 13/00; G05B 19/402;
(Continued)

(56) References Cited

U.S. PATENT DOCUMENTS

| 6,257,109 | B1 | 7/2001 | Shinohara et al. |
| 2011/0307212 | A1* | 12/2011 | Nishikawa ........... G05B 19/401 702/152 |

(Continued)

FOREIGN PATENT DOCUMENTS

| CN | 101976056 A | 2/2011 |
| CN | 103707132 A | 4/2014 |

(Continued)

OTHER PUBLICATIONS

International Search Report issued by the Japanese Patent Office acting as the International Searching Authority in relation to International Application No. PCT/JP2021/015113 dated Jun. 15, 2021 (3 pages) along with English language translation (2 pages).

(Continued)

*Primary Examiner* — Kidest Bahta
(74) *Attorney, Agent, or Firm* — Robert P. Michal, Esq.; Carter, DeLuca & Farrell LLP

(57) ABSTRACT

A machine tool capable of easily acquiring the distance between a spindle of a first unit and a holder of a second unit. A machine tool according to one embodiment comprises: relative movement mechanisms which move a table for supporting an object to be machined relatively to a support unit for supporting the first N unit and the second unit: a movement control unit which controls the relative movement mechanisms; a relative position detection unit which detects the position of the table relative to the support unit; and a distance calculation unit which calculates the distance between the first unit and the second unit on the basis of a relative position when the first unit and the table reach a first relative positional relationship and a relative position when the second unit and the table reach a second relative positional relationship.

4 Claims, 7 Drawing Sheets

(58) Field of Classification Search
CPC ........... G05B 2219/49178; G05B 2219/49222; G05B 2219/49223; G05B 2219/49233; G05B 2219/4923
See application file for complete search history.

(56) References Cited

U.S. PATENT DOCUMENTS

| | | | |
|---|---|---|---|
| 2015/0233693 A1* | 8/2015 | Senn | B23Q 17/20 451/5 |
| 2017/0308055 A1* | 10/2017 | Hoshino | G05B 19/409 |
| 2019/0163161 A1* | 5/2019 | Sonoda | G05B 13/0265 |

FOREIGN PATENT DOCUMENTS

| | | | |
|---|---|---|---|
| CN | 105436532 A | | 3/2016 |
| CN | 206047115 U | | 3/2017 |
| CN | 107206563 A | | 9/2017 |
| CN | 107544427 A | | 1/2018 |
| CN | 108788200 A | | 11/2018 |
| JP | H06126571 A | | 5/1994 |
| JP | 2003136370 A | | 5/2003 |
| JP | 2004216526 A | | 8/2004 |
| JP | 2006192516 A | * | 7/2006 |
| JP | 2012210681 A | | 11/2012 |
| JP | 2016153149 A | | 8/2016 |

OTHER PUBLICATIONS

Written Opinion of the International Searching Authority issued by the Japanese Patent Office acting as the International Searching Authority in relation to International Application No. PCT/JP2021/015113 dated Jun. 15, 2021 (3 pages).

* cited by examiner

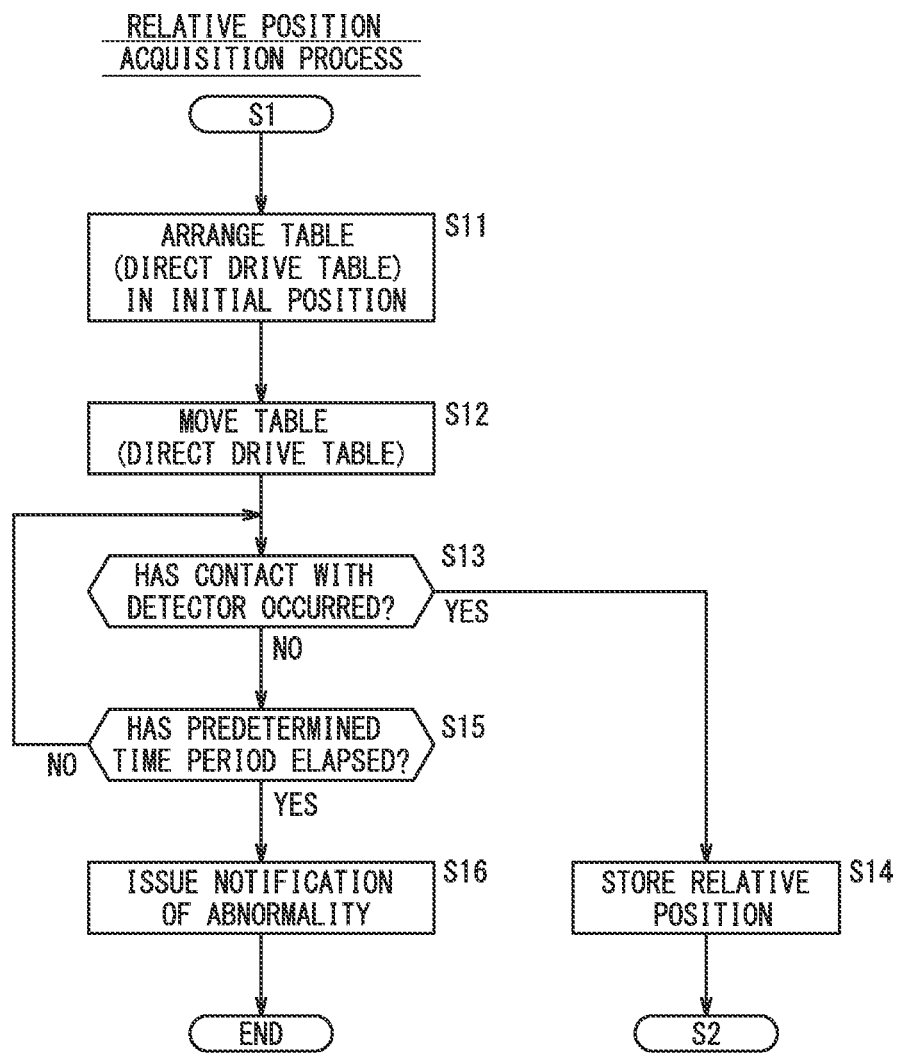

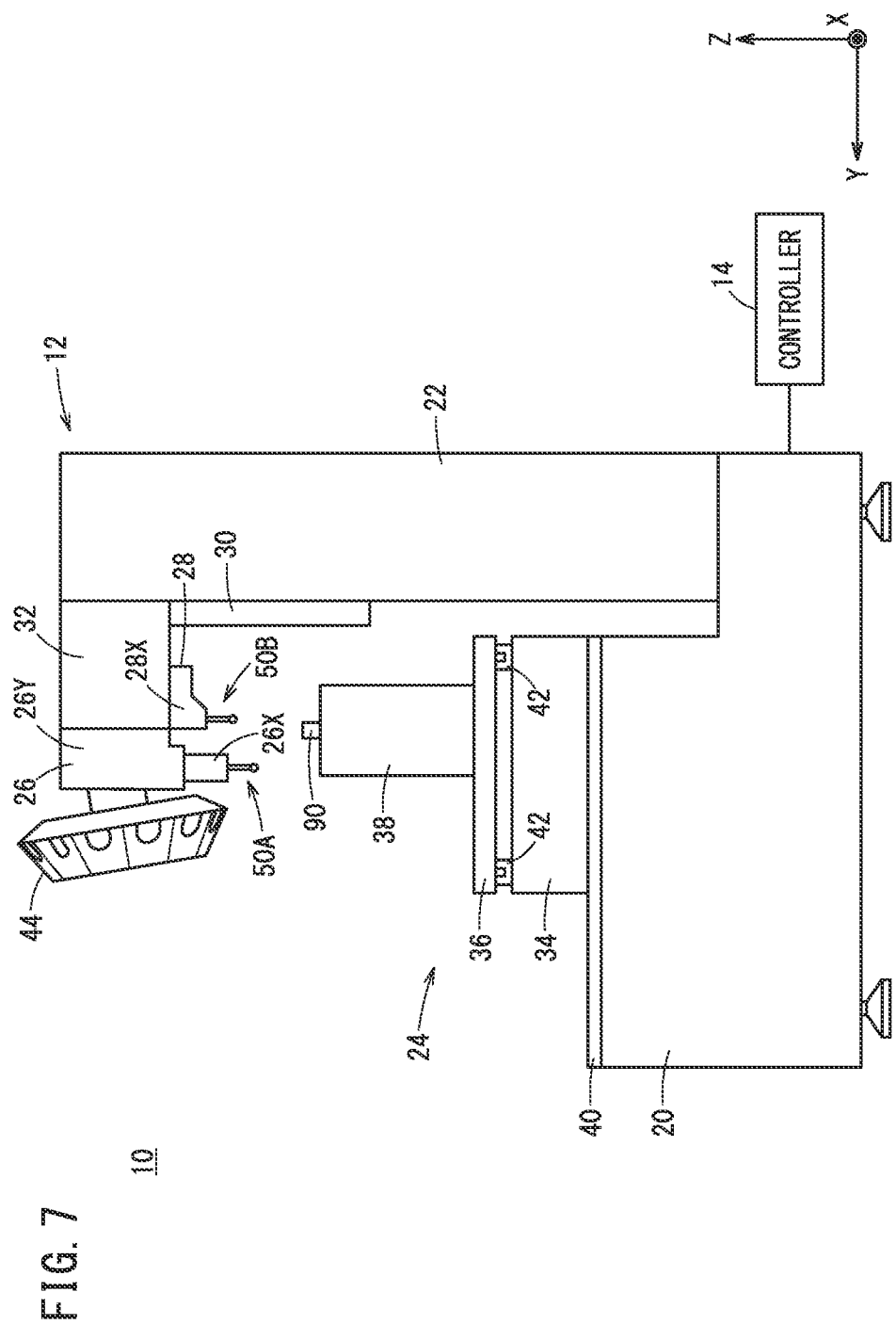

MACHINE TOOL

CROSS-REFERENCE TO RELATED APPLICATIONS

This application is a national phase entry under 35 U.S.C. 371 of PCT International Application No. PCT/JP2021/015113, filed Apr. 12, 2021, which claims priority to Japanese Patent Application No. 2020-073862, filed Apr. 17, 2020, the disclosure of each of these applications is expressly incorporated herein by reference in their entirety.

TECHNICAL FIELD

The present invention relates to a machine tool for machining an object to be machined using a tool.

BACKGROUND ART

A machine tool equipped with a cutting unit (a spindle head) having a spindle, and a turning unit provided in the vicinity thereof has been proposed (see, for example, JP 2016-153149 A). In the machine tool disclosed in JP 2016-153149 A, a positional relationship between the cutting unit and the turning unit is fixed in a manner so as not to change.

SUMMARY OF THE INVENTION

However, in the case of the machine tool disclosed in JP 2016-153149 A, every time that machining is initiated using a cutting tool or a lathe machining tool, it is necessary to measure the distance between a spindle of the cutting unit on which the cutting tool is mounted, and a holder of the turning unit on which the lathe machining tool is mounted, and to set the measured value in the machine tool.

Therefore, an object of the present invention is to provide a machine tool that is capable of easily acquiring the distance between a spindle of a first unit and a holder of a second unit.

According to an aspect of the present invention, provided is a machine tool including:

a first unit including a spindle on which a first tool is mounted;

a second unit on which the first tool or a second tool that differs from the first tool is mounted;

a support member configured to support the first unit and the second unit;

a table configured to support an object to be machined;

a relative movement mechanism configured to cause the table to move relative to the support member;

a movement control unit configured to control the relative movement mechanism;

a relative position detection unit configured to detect a relative position of the table with respect to the support member; and a distance calculation unit configured to calculate a distance between the first unit and the second unit, based on the relative position when the first unit and the table have arrived at a first relative positional relationship, and the relative position when the second unit and the table have arrived at a second relative positional relationship.

According to this aspect of the present invention, the distance between the spindle of the first unit and the holder of the second unit can be easily acquired.

BRIEF DESCRIPTION OF DRAWINGS

FIG. 6 is a flowchart showing a procedure of a relative position acquisition processing routine; and FIG. 7 is a side view showing a machine tool according to a first exemplary modification.

DESCRIPTION OF THE INVENTION

A preferred embodiment of the present invention will be presented and described in detail below with reference to the accompanying drawings.

Figure 1:
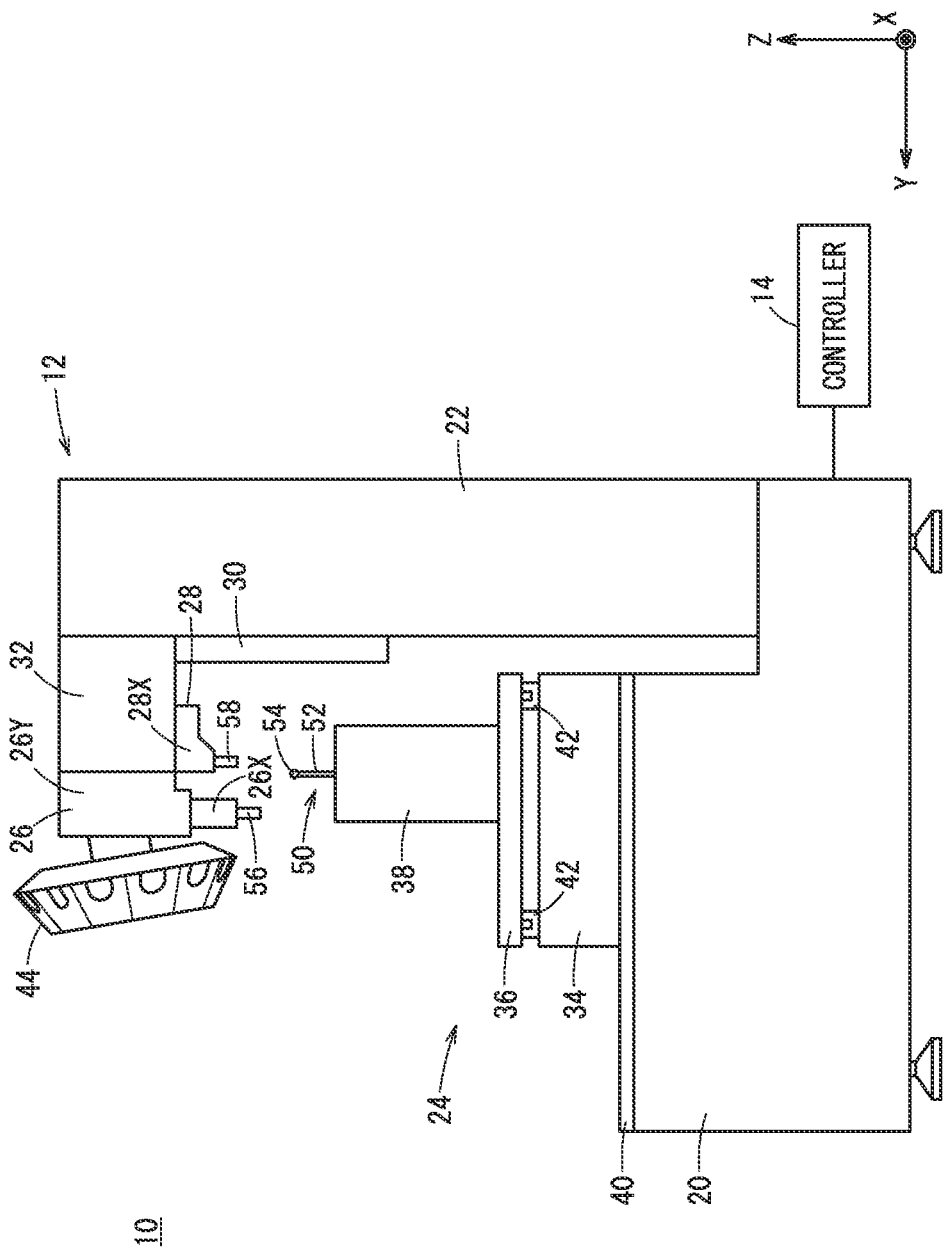
FIG. 1 is a side view showing a machine tool according to an embodiment of the present invention.

FIG. 1 is a side view showing a machine tool 10 according to an embodiment of the present invention. The machine tool 10 serves to carry out machining on an object to be machined. The machine tool 10 may be a machining center, a lathing machine, or a processing machine other than a machining center and a lathing machine. According to the present embodiment, the machine tool 10 is a machining center.

In the machine tool 10, a machine coordinate system is defined which includes an X-axis, a Y-axis, and a Z-axis that intersect each other at right angles. According to the present embodiment, a forward direction (a +X direction) of the X-axis is defined as a right direction (a right side), and a reverse direction (a −X direction) opposite to the forward direction is defined as a left direction (a left side). Further, according to the present embodiment, a forward direction (a +Y direction) of the Y-axis is defined as a front direction (a front side), and a reverse direction (a −Y direction) opposite to the forward direction is defined as a rearward direction (a rear side). Further, according to the present embodiment, a forward direction (a +Z direction) of the Z-axis is defined as an upward direction (an upper side), and a reverse direction (a −Z direction) opposite to the forward direction is defined as a downward direction (a lower side).

The machine tool 10 includes a machine main body 12 and a controller 14 for controlling the machine main body 12. The machine main body 12 includes a bed 20, a column 22, a table 24, a cutting unit 26, and a turning unit 28.

The bed 20 is a base of the machine tool 10. The bed 20 is provided on a foundation such as a ground surface and a floor. The column 22 is provided on an installation surface of the bed 20. Moreover, the installation surface is a surface on an opposite side (an upper side) from a surface on the foundation side (a lower side).

The column 22 is a support column for supporting the cutting unit 26 and the turning unit 28. The column 22 extends toward the upward direction that intersects with the installation surface of the bed 20. A Z-axis rail 30 that extends along a Z-axis direction (the upper/lower direction) is provided on the column 22. A support member 32 that supports the cutting unit 26 and the turning unit 28 is connected to the Z-axis rail 30 so as to be capable of moving on the Z-axis rail 30.

The table 24 serves to support the object to be machined. The table 24 is provided closer to the foundation side (the lower side) than the cutting unit 26 and the turning unit 28 are. The table 24 includes a saddle 34, a direct drive table 36, and a rotary table 38.

The saddle 34 is movably connected to a Y-axis rail 40 that extends along a Y-axis direction (a front/rear direction). The Y-axis rail 40 is provided on the installation surface of the bed 20. The direct drive table 36 is movably connected to an X-axis rail 42 that extends along an X-axis direction (the left/right direction). The X-axis rail 42 is provided on an installation surface of the saddle 34. The rotary table 38 is provided on an installation surface of the direct drive table 36, and includes a rotating shaft that extends along the Z-axis direction (the upper/lower direction). Moreover, the rotary table 38 may include an inclined portion that causes an installation surface of the rotary table 38 to be inclined. The object to be machined is fixed by a predetermined fixture to the installation surface of the rotary table 38.

According to the present embodiment, a sensor 50 is mounted on the table 24 by fixing the sensor 50 to the installation surface of the rotary table 38. The sensor 50 is used in order to acquire the distance between the cutting unit 26 and the turning unit 28. The sensor 50 includes a support rod 52 that extends in the upward direction from the installation surface of the rotary table 38 to the support member 32 side, and a spherical shaped detector 54 disposed on a distal end of the support rod 52. The detector 54 outputs a signal indicating the presence or absence of contact with an object.

The cutting unit 26 is a unit on which a cutting tool is mounted, and is capable of being attached and detached to and from the support member 32. The cutting unit 26 corresponds to a portion referred to as a spindle head. The cutting unit 26 includes a spindle 26X, a housing 26Y through which the spindle 26X is inserted and which is fixed to the support member 32, and a bearing (not shown) that rotatably supports the spindle 26X with respect to the housing 26Y. The cutting unit 26 may be provided with a turret type automatic changer 44.

The spindle 26X extends toward the table 24. At an end part of the spindle 26X on the table 24 side, an attachment and detachment mechanism (a holder) capable of attaching and detaching the cutting tool is provided. According to the present embodiment, a first object to be detected 56 is mounted on the cutting unit 26 by the first object to be detected 56 being installed on the attachment and detachment mechanism. The first object to be detected 56 serves as a detection target for the sensor 50, and is used in order to acquire the distance between the cutting unit 26 and the turning unit 28.

The turning unit 28 is a unit on which a lathe machining tool is mounted, and is capable of being attached and detached to and from the support member 32. The turning unit 28 includes a housing 28X that is fixed to the support member 32. An attachment and detachment mechanism (a holder) capable of attaching and detaching the lathe machining tool is provided on a predetermined site on a surface of the housing 28X on the table 24 side. According to the present embodiment, a second object to be detected 58 is mounted on the turning unit 28 by the second object to be detected 58 being installed on the attachment and detachment mechanism. The second object to be detected 58 is used in order to acquire the distance between the cutting unit 26 and the turning unit 28. The second object to be detected 58 may be formed with the same shape as the first object to be detected 56. According to the present embodiment, the second object to be detected 58 has a cylindrical shape, which is the same as the shape of the first object to be detected 56.

The controller 14 includes a cutting control mode and a turning control mode. In the case of the cutting control mode, the controller 14 uses the cutting tool that is mounted on the cutting unit 26, and carries out a cutting process on an object to be machined that is supported on the table 24. In this case, in a state in which the rotary table 38 is placed in a non-rotating state and the spindle 26X is made to rotate, the controller 14 causes one of the table 24 or the cutting unit 26 to move relative to another of the table 24 and the cutting unit 26 in the X-axis direction, the Y-axis direction, or the Z-axis direction.

On the other hand, in the case of the turning control mode, the controller 14 uses the lathe machining tool that is mounted on the turning unit 28, and carries out a turning process on the object to be machined that is supported on the table 24. In this case, in a state in which the spindle 26X is placed in a non-rotating state and the rotary table 38 is made to rotate, the controller 14 causes one of the table 24 or the turning unit 28 to move relative to another of the table 24 and the turning unit 28 in the X-axis direction, the Y-axis direction, or the Z-axis direction.

Figure 2:
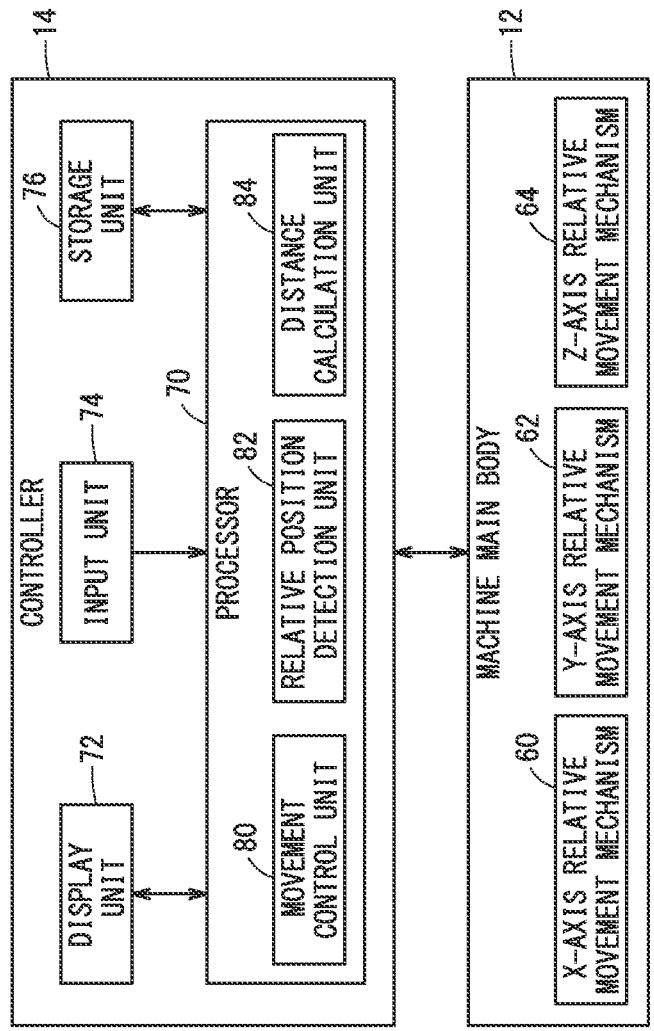
FIG. 2 is a block diagram showing a configuration of the machine tool according to the embodiment.

FIG. 2 is a block diagram showing a configuration of the machine tool 10 according to the embodiment. The machine main body 12 includes an X-axis relative movement mechanism 60, a Y-axis relative movement mechanism 62, and a Z-axis relative movement mechanism 64.

The X-axis relative movement mechanism 60 serves to cause the table 24 to move relative to the support member 32 in the X-axis direction. The X-axis relative movement mechanism 60 includes an X-axis motor, a ball screw that rotates in accordance with driving of the X-axis motor, and a nut that is screw-engaged on the ball screw, and the X-axis relative movement mechanism 60 causes the direct drive table 36 of the table 24 to move relatively in the X-axis direction through the nut. Consequently, the direct drive table 36 moves on the X-axis rail 42. Moreover, in the case that the X-axis motor rotates clockwise (or counterclockwise), the direct drive table 36 moves relatively in a rightward direction. On the other hand, in the case that the X-axis motor rotates counterclockwise (or clockwise), the direct drive table 36 moves relatively in a leftward direction.

The Y-axis relative movement mechanism 62 serves to cause the table 24 to move relative to the support member 32 in the Y-axis direction. The Y-axis relative movement mechanism 62 includes a Y-axis motor, a ball screw that rotates in accordance with driving of the Y-axis motor, and a nut that is screw-engaged on the ball screw, and the Y-axis relative movement mechanism 62 causes the saddle 34 of the table 24 to move relatively in the Y-axis direction through the nut. Consequently, the saddle 34 moves on the Y-axis rail 40. Moreover, in the case that the Y-axis motor rotates clockwise (or counterclockwise), the saddle 34 moves relatively in the forward direction. On the other hand, in the case that the Y-axis motor rotates counterclockwise (or clockwise), the saddle 34 moves relatively in the rearward direction.

The Z-axis relative movement mechanism 64 serves to cause the table 24 to move relative to the support member 32 in the Z-axis direction. The Z-axis relative movement mechanism 64 includes a Z-axis motor, a ball screw that rotates in accordance with driving of the Z-axis motor, and a nut that is screw-engaged on the ball screw, and the Z-axis relative movement mechanism 64 causes the support member 32 to move relatively in the Z-axis direction through the nut. Consequently, the support member 32 moves on the Z-axis rail 30. Moreover, in the case that the Z-axis motor rotates clockwise (or counterclockwise), the support member 32 moves relatively in the upward direction. On the other hand, in the case that the Z-axis motor rotates counterclockwise (or clockwise), the support member 32 moves relatively in the downward direction.

The controller 14 includes a processor 70, a display unit 72, an input unit 74, and a storage unit 76. The processor 70 serves to process information. As specific examples of the processor 70, there may be cited a CPU, a GPU, or the like. The display unit 72 serves to display information. As specific examples of the display unit 72, there may be cited a liquid crystal display, an organic EL display, or the like. The input unit 74 serves to input information. As specific examples of the input unit 74, there may be cited a keyboard, a mouse, a touch panel, or the like. The storage unit 76 serves to store information. As specific examples of the storage unit 76, there may be cited a hard disk, a portable memory, or the like.

In the storage unit 76, there are stored a machining program for machining the object to be machined, a distance calculation program for acquiring the distance between the cutting unit 26 and the turning unit 28, and shape information or the like indicative of the shapes of the first object to be detected 56, the second object to be detected 58, and the detector 54. Moreover, the shape information is input from the input unit 74. In the case of the present embodiment, the shape information includes a radius (or a diameter) and a height of the first object to be detected 56 and the second object to be detected 58, which have a cylindrical shape, and a radius (or a diameter) of the detector 54, which has a spherical shape.

In the case of executing the distance calculation program stored in the storage unit 76, the processor 70 functions as a movement control unit 80, a relative position detection unit 82, and a distance calculation unit 84. In this case, the spindle 26X and the rotary table 38 do not rotate.

Figure 3:
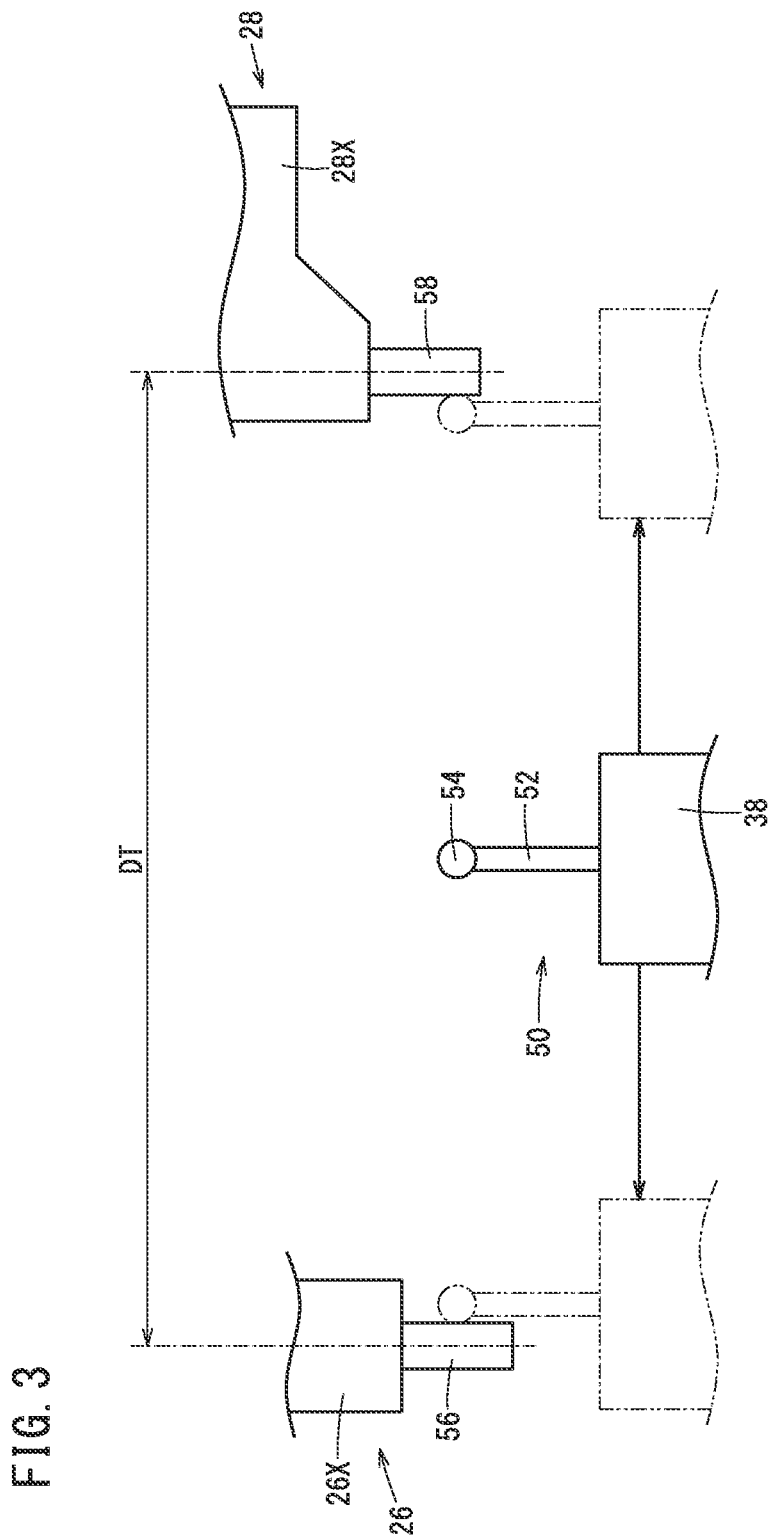
FIG. 3 is a diagram showing a state of movement of a cutting unit and a turning unit in a left/right direction.

The movement control unit 80 serves to control the X-axis relative movement mechanism 60, the Y-axis relative movement mechanism 62, or the Z-axis relative movement mechanism 64. In the case of controlling the X-axis relative movement mechanism 60, as illustrated in FIG. 3, the movement control unit 80 causes the table 24 (the direct drive table 36) to move relatively in the rightward direction (or the leftward direction) from a predetermined starting position until the detector 54 of the sensor 50 comes into contact with the first object to be detected 56 of the cutting unit 26. Further, the movement control unit 80 causes the table 24 (the direct drive table 36) to move relatively in the leftward direction (or the rightward direction) from a predetermined starting position until the detector 54 comes into contact with the second object to be detected 58 of the turning unit 28.

Moreover, the movement control unit 80 detects the contact of the detector 54 based on a signal output from the detector 54. Further, the starting position when the table 24 is moved relatively in a manner so that the detector 54 comes into contact with the first object to be detected 56, and the starting position when the table 24 is moved relatively in a manner so that the detector 54 comes into contact with the second object to be detected 58 may be the same or may be different from each other.

Although not illustrated, the case of controlling the Y-axis relative movement mechanism 62 is the same as the case of controlling the X-axis relative movement mechanism 60. More specifically, the movement control unit 80 causes the table 24 (or the saddle 34) to move relatively in the forward direction or in the rearward direction, in a manner so that the detector 54 comes into contact with each of the first object to be detected 56 and the second object to be detected 58, from a predetermined starting position until contact of the detector 54 is detected.

Figure 4:
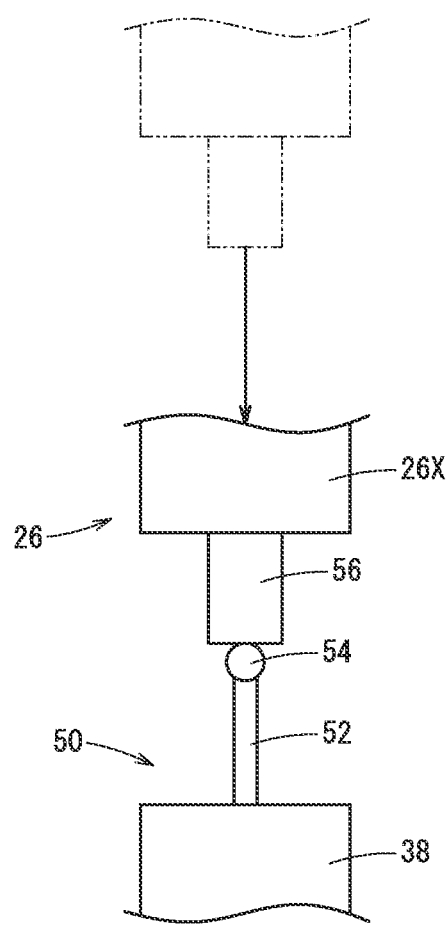
FIG. 4 is a diagram showing a state of movement of the cutting unit in an upper/lower direction.

In the case of controlling the Z-axis relative movement mechanism 64, as illustrated in FIG. 4, the movement control unit 80 causes the support member 32 to move relatively in the downward direction from a predetermined starting position until the detector 54 comes into contact with the first object to be detected 56. Further, although not illustrated, the movement control unit 80 causes the support member 32 to move in the downward direction from the predetermined starting position until the detector 54 comes into contact with the second object to be detected 58. Moreover, the starting position when the support member 32 is moved relatively in a manner so that the detector 54 comes into contact with the first object to be detected 56, and the starting position when the support member 32 is moved relatively in a manner so that the detector 54 comes into contact with the second object to be detected 58 may be the same or may be different from each other.

The relative position detection unit 82 detects the relative position of the table 24 with respect to the support member 32. Based on signals output from the detector 54 of the sensor 50, the relative position detection unit 82 detects the relative position of the axes in accordance with the control of the movement control unit 80.

More specifically, in the case that the movement control unit 80 controls the X-axis relative movement mechanism 60, the relative position detection unit 82 detects, based on rotational position information detected by an encoder, the relative position of the table 24 (the direct drive table 36) that moves relative to the support member 32. It should be noted that such an encoder is provided in the X-axis motor of the X-axis relative movement mechanism 60.

On the other hand, in the case that the movement control unit 80 controls the Y-axis relative movement mechanism 62, the relative position detection unit 82 detects, based on rotational position information detected by an encoder, the relative position of the table 24 (the saddle 34) that moves relative to the support member 32. It should be noted that such an encoder is provided in the Y-axis motor of the Y-axis relative movement mechanism 62.

Further, in the case that the movement control unit 80 controls the Z-axis relative movement mechanism 64, the relative position detection unit 82 detects, based on rotational position information detected by an encoder, the relative position of the support member 32 that moves relative to the table 24. It should be noted that such an encoder is provided in the Z-axis motor of the Z-axis relative movement mechanism 64.

The distance calculation unit 84 serves to calculate the distance between the cutting unit 26 and the turning unit 28. The distance calculation unit 84 calculates the axial distance in accordance with the control of the movement control unit 80 based on the detection result of the relative position detection unit 82 and the shape information stored in the storage unit 76.

More specifically, in the case that the movement control unit 80 controls the X-axis relative movement mechanism 60, the distance calculation unit 84 calculates a distance DT in the X-axis direction (see FIG. 3) between the center of the first object to be detected 56 of the cutting unit 26, and the center of the second object to be detected 58 of the turning unit 28. In this case, the distance calculation unit 84 calculates the distance DT in the X-axis direction on the basis of the starting position when the movement control unit 80 causes the direct drive table 36 to move relatively, the relative position of the direct drive table 36 when the detector 54 comes into contact with each of the first object to be detected 56 and the second object to be detected 58, and the shape information.

Moreover, as noted previously, the shape information includes a radius (or a diameter) and a height of the first object to be detected 56 which has a cylindrical shape, a radius (or a diameter) and a height of the second object to be detected 58 which has a cylindrical shape, and a radius (or a diameter) of the detector 54 which has a spherical shape. Further, the centers of the first object to be detected 56 and the second object to be detected 58 are centers (cylindrical axes) in the Z-axis direction.

On the other hand, in the case that the movement control unit 80 controls the Y-axis relative movement mechanism 62, the distance calculation unit 84 calculates a distance in the Y-axis direction between the center of the first object to be detected 56 of the cutting unit 26, and the center of the second object to be detected 58 of the turning unit 28. In this case, the distance calculation unit 84 calculates the distance in the Y-axis direction on the basis of the starting position when the movement control unit 80 causes the saddle 34 to move relatively, the relative position of the saddle 34 when the detector 54 comes into contact with each of the first object to be detected 56 and the second object to be detected 58, and the shape information.

Further, in the case that the movement control unit 80 controls the Z-axis relative movement mechanism 64, the distance calculation unit 84 calculates a distance in the Z-axis direction between the end surface of the first object to be detected 56 of the cutting unit 26, and the end surface of the second object to be detected 58 of the turning unit 28. In this case, the distance calculation unit 84 calculates the distance in the Z-axis direction on the basis of the starting position when the movement control unit 80 causes the support member 32 to move relatively, the relative position of the support member 32 when the detector 54 comes into contact with each of the first object to be detected 56 and the second object to be detected 58, and the shape information. Moreover, the end surfaces of the first object to be detected 56 and the second object to be detected 58 are end surfaces of the end parts thereof on the table 24 side.

Figure 5:
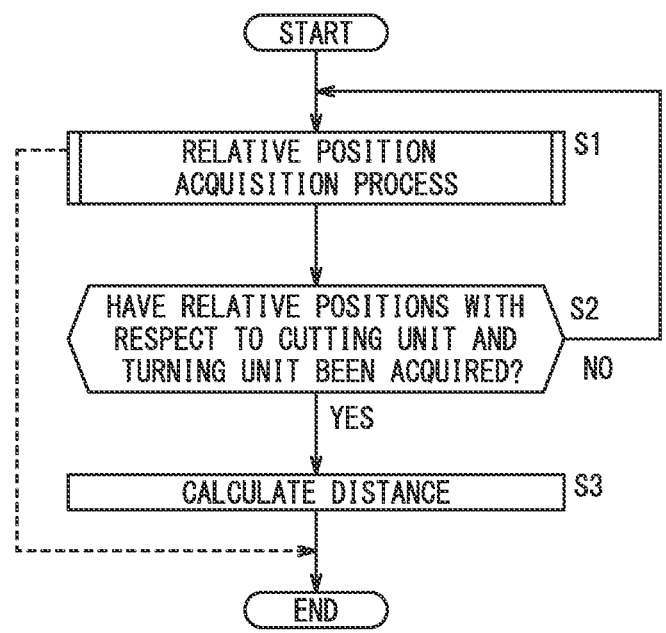
FIG. 5 is a flowchart showing a procedure of a distance calculation process.

Next, a description will be given of the distance calculation process of the controller 14 in which the distance calculation program is executed. Moreover, since the processing content of the distance calculation process for calculating the distance DT in the X-axis direction, the distance calculation process for calculating the distance in the Y-axis direction, and the distance calculation process for calculating the distance in the Z-axis direction are the same, only the distance calculation process for calculating the distance DT in the X-axis direction will be explained in the description of the distance calculation process. FIG. 5 is a flowchart showing a procedure of the distance calculation process.

In step S1, the processor 70 executes a relative position acquisition processing routine, to cause the direct drive table 36 to move in a manner so that the detector 54 of the sensor 50 comes into contact with the first object to be detected 56 of the cutting unit 26 or the second object to be detected 58 of the turning unit 28. In the case that the direct drive table 36 is relatively moved in a manner so that the detector 54 comes into contact with the first object to be detected 56, the processor 70 acquires the relative position of the direct drive table 36 when the detector 54 is placed in contact with the first object to be detected 56. On the other hand, in the case that the direct drive table 36 is relatively moved in a manner so that the detector 54 comes into contact with the second object to be detected 58, the processor 70 acquires the relative position of the direct drive table 36 when the detector 54 is placed in contact with the second object to be detected 58. When the relative position of the direct drive table 36 at the time when the detector 54 is placed in contact with the first object to be detected 56 or the second object to be detected 58 is acquired, the distance calculation process transitions to step S2.

In step S2, the processor 70 determines whether or not both the relative position of the direct drive table 36 when the detector 54 is placed in contact with the first object to be detected 56, and the relative position of the direct drive table 36 when the detector 54 is placed in contact with the second object to be detected 58 have been acquired. In this instance, in the case that both of the relative positions have not been acquired, the distance calculation process returns to step S1. On the other hand, in the case that both of the relative positions have been acquired, the distance calculation process transitions to step S3.

In step S3, the processor 70 calculates the distance DT in the X-axis direction (see FIG. 3), on the basis of the relative position acquired in step S1, the starting position when the direct drive table 36 is relatively moved, and the shape information that is stored in the storage unit 76. When the distance DT in the X-axis direction is calculated, the distance calculation process comes to an end.

Next, a description will be given concerning a relative position acquisition processing routine. It should be noted that only the relative position acquisition processing routine in the case of executing the distance calculation process for calculating the distance DT in the X-axis direction will be explained in the description of the relative position acquisition processing routine. FIG. 6 is a flowchart showing a procedure of the relative position acquisition processing routine.

In step S11, the processor 70 appropriately controls each of the relative movement mechanisms 60, 62, and 64, in a manner so that the cutting unit 26 or the turning unit 28, and the table 24 are arranged in their initial positions. In a state in which the cutting unit 26 is arranged in the initial position, the first object to be detected 56 mounted on the cutting unit 26 is positioned at a predetermined fixed position. Further, in a state in which the turning unit 28 is arranged in the initial position, the second object to be detected 58 mounted on the turning unit 28 is positioned at a predetermined fixed position. Further, in a state in which the table 24 is arranged in the initial position, the detector 54 of the sensor 50 is positioned at the predetermined starting position. When the cutting unit 26 or the turning unit 28, and the table 24 have been arranged in their initial positions, the relative position acquisition processing routine transitions to step S12.

In step S12, the processor 70 controls the X-axis relative movement mechanism 60, in a manner so that the direct drive table 36 moves toward the cutting unit 26 or the turning unit 28. Consequently, the detector 54 approaches toward the first object to be detected 56 or the second object to be detected 58 which is positioned at the fixed position. When the control of the X-axis relative movement mechanism 60 is initiated, the relative position acquisition processing routine transitions to step S13.

In step S13, based on a signal output from the detector 54, the processor 70 determines whether or not the first object to be detected 56 or the second object to be detected 58 has come into contact with the detector 54.

In this instance, in the case that the detector 54 has been placed in contact with the first object to be detected 56 or the second object to be detected 58, the relative position acquisition processing routine transitions to step S14. Moreover, the first object to be detected 56 is mounted on the cutting unit 26 that is supported by the support member 32, and the sensor 50 is mounted on the direct drive table 36 that moves relative to the support member 32. Therefore, when the sensor 50 has detected the first object to be detected 56 (when the sensor comes into contact with the first object to be detected 56), the cutting unit 26 and the direct drive table 36 have arrived at a first relative positional relationship. On the other hand, the second object to be detected 58 is mounted on the turning unit 28 that is supported by the support member 32, and the sensor 50 is mounted on the direct drive table 36 that moves relative to the support member 32. Therefore, when the sensor 50 has detected the second object to be detected 58 (when the sensor comes into contact with the second object to be detected 58), the turning unit 28 and the direct drive table 36 have arrived at a second relative positional relationship.

In step S14, the processor 70 stores, in the storage unit 76, the relative position of the direct drive table 36 when the detector 54 has come into contact with the first object to be detected 56, or the relative position of the direct drive table 36 when the detector 54 has come into contact with the second object to be detected 58. When the relative position is stored in the storage unit 76, the relative position acquisition processing routine transitions to the aforementioned step S2 (see FIG. 5).

On the other hand, in the case that the detector 54 has not been placed in contact with the first object to be detected 56 or the second object to be detected 58, the relative position acquisition processing routine transitions to step S15. In step S15, the processor 70 determines whether or not a predetermined period of time has elapsed since the control of the X-axis relative movement mechanism 60 was started. In this instance, in the case that the predetermined time period has not elapsed, the relative position acquisition processing routine returns to step S13. On the other hand, in the case that the predetermined time period has elapsed, there is a high possibility that the detector 54 will not come into contact with the first object to be detected 56 or the second object to be detected 58 which is positioned at the fixed position. In this case, the relative position acquisition processing routine transitions to step S16.

In step S16, the processor 70 issues a notification of an abnormality, for example, by displaying, on the display unit 72, that there is a high possibility that the distance is incapable of being calculated. When the notification of such an abnormality is issued, the relative position acquisition processing routine comes to an end. Moreover, in the case that the relative position acquisition processing routine has come to an end, the distance calculation process also comes to an end.

In the foregoing manner, in the machine tool 10 according to the present embodiment, the sensor 50 is mounted on the installation surface of the rotary table 38 that supports the object to be machined. On the other hand, in the cutting unit 26, the first object to be detected 56 is mounted on the attachment and detachment mechanism (the holder) of the spindle 26X on which the cutting tool is mounted, and in the turning unit 28, the second object to be detected 58 is mounted on the attachment and detachment mechanism (the holder) on which the lathe machining tool is mounted. Using the sensor 50, the first object to be detected 56, and the second object to be detected 58, the machine tool 10 calculates the distance DT in the X-axis direction (see FIG. 3), the distance in the Y-axis direction, and the distance in the Z-axis direction between the cutting unit 26 and the turning unit 28. Consequently, the distance between the spindle 26X of the cutting unit 26 and the holder of the turning unit 28 can be easily acquired.

Moreover, in the case of the present embodiment, both the first object to be detected 56 that is mounted on the cutting unit 26 and the second object to be detected 58 that is mounted on the turning unit 28 can be detected by the single sensor 50. Further, in the case that the cutting tool is the first object to be detected 56 and the lathe machining tool is the second object to be detected 58, the distance between the cutting unit 26 and the turning unit 28 can be calculated even without changing the tools.

The above-described embodiment may be modified in the following manner.

Exemplary Modification 1

FIG. 7 is a side view showing the machine tool 10 according to a first exemplary modification. In FIG. 7, the same reference numerals are applied to configurations that are equivalent to the configurations described in the embodiment. Moreover, in the present exemplary modification, descriptions that overlap or are duplicative of those stated in the embodiment will be omitted.

Instead of the sensor 50 according to the embodiment, the machine tool 10 according to the present exemplary modification includes a first sensor 50A and a second sensor 50B. Each of the first sensor 50A and the second sensor 50B includes the same support rod 52 and the same detector 54 as in the embodiment.

The first sensor 50A is mounted instead of the first object to be detected 56 according to the embodiment. In other words, in the cutting unit 26, the first sensor 50A is mounted on the attachment and detachment mechanism (the holder) of the spindle 26X on which the cutting tool is mounted. On the other hand, the second sensor 50B is mounted instead of the second object to be detected 58 according to the embodiment. In other words, in the turning unit 28, the second sensor 50B is mounted on the attachment and detachment mechanism (the holder) on which the lathe machining tool is mounted.

On the other hand, an object to be detected 90 is mounted instead of the sensor 50 according to the embodiment. In other words, the object to be detected 90 is mounted on the installation surface of the rotary table 38 that supports the object to be machined. The object to be detected 90 serves as a detection target for the first sensor 50A and the second sensor 50B, and in the same manner as in the embodiment, the object to be detected 90 is used in order to acquire the distance between the cutting unit 26 and the turning unit 28. The shape of the object to be detected 90 may be a cylindrical shape or a polygonal columnar shape such as a quadrangular prism. Further, the object to be detected 90 may be the rotary table 38.

Also according to the present exemplary modification, by executing the distance calculation process in the same manner as in the embodiment, the distance DT in the X-axis direction (see FIG. 3), the distance in the Y-axis direction, and the distance in the Z-axis direction between the cutting unit 26 and the turning unit 28 can be calculated. Accordingly, in the same manner as in the embodiment, the distance between the spindle 26X of the cutting unit 26 and the holder of the turning unit 28 can be easily acquired.

Moreover, in the case of the present exemplary modification, since the sensor need not be provided on the table 24 side, and further, a predetermined site (for example, the rotary table 38) on the table 24 can be used as the object to be detected 90, the work space of the table 24 is less likely to become restricted.

Exemplary Modification 2

The sensor 50 of the embodiment, or the object to be detected 90 of the first exemplary modification may be mounted on a site of the table 24 other than the installation surface of the rotary table 38. In such a case, it is necessary to store, in the storage unit 76 beforehand together with the shape information, information indicative of the distance in the X-axis direction, the Y-axis direction, and the Z-axis direction between the mounted position of the sensor 50 or the object to be detected 90 and a reference position on the installation surface of the rotary table 38. It should be noted that the reference position is a position determined as a reference within a region in which the object to be machined is supported on the installation surface of the rotary table 38. In the above-described embodiment, the sensor 50 is mounted at the aforementioned reference position.

Further, the first object to be detected 56 of the embodiment, or the first sensor 50A of the first exemplary modification may be mounted on a site of the cutting unit 26 other than the attachment/detachment mechanism (the holder) of the spindle 26X. Moreover, in such a case, it is necessary to store, in the storage unit 76 beforehand together with the shape information, information indicative of the distance in the X-axis direction, the Y-axis direction, and the Z-axis direction between the mounted position of the first object to be detected 56 or the first sensor 50A and the attachment and detachment mechanism (the holder).

Further, the second object to be detected 58 of the embodiment, or the second sensor 50B of the first exemplary modification may be mounted on a site of the turning unit 28 other than the attachment/detachment mechanism (the holder). Moreover, in such a case, it is necessary to store, in the storage unit 76 beforehand together with the shape information, information indicative of the distance in the X-axis direction, the Y-axis direction, and the Z-axis direction between the mounted position of the second object to be detected 58 or the second sensor 50B and the attachment and detachment mechanism (the holder).

Exemplary Modification 3

The sensor 50 of the embodiment, or the first sensor 50A and the second sensor 50B of the first exemplary modification are contact sensors, however, the sensors may be laser displacement sensors. Such a laser displacement sensor irradiates a laser from a light emitting unit toward a light receiving unit at one or more predetermined irradiation angles, and detects the arrival of an object based on a shadow generated by the object blocking the laser. Also with such a laser displacement sensor, by executing the distance calculation process in the same manner as in the embodiment, the distance DT in the X-axis direction (see FIG. 3), the distance in the Y-axis direction, and the distance in the Z-axis direction between the cutting unit 26 and the turning unit 28 can be calculated. Accordingly, in the same manner as in the embodiment, the distance between the spindle 26X of the cutting unit 26 and the holder of the turning unit 28 can be easily acquired.

Exemplary Modification 4

Instead of the cutting tool, the lathe machining tool can be installed on the attachment and detachment mechanism (the holder) provided at the end part of the spindle 26X on the cutting unit 26. In the case that the lathe machining tool is installed, machining is implemented in a state in which the spindle 26X is placed in a non-rotating state. Further, instead of the cutting tool, a tool other than the lathe machining tool can be installed on the attachment and detachment mechanism (the holder). In other words, the cutting unit 26 can be referred to as a first unit which includes the spindle 26X on which a first tool is mounted.

On the other hand, instead of the lathe machining tool, the cutting tool, or a comb-shaped tool with a plurality of cutting edges, or alternatively, a tool other than the cutting tool and the comb-shaped tool can be installed on the attachment and detachment mechanism (the holder) of the turning unit 28. In other words, the turning unit 28 can be referred to as a second unit on which the first tool that is installed on the first unit or a second tool that differs from the first tool is mounted.

The inventions that are capable of being grasped from the above-described embodiments will be described below.

The present invention is characterized by the machine tool (10). The machine tool (10) includes the first unit (26) including the spindle (26X) on which the first tool is mounted, the second unit (28) on which the first tool or the second tool that differs from the first tool is mounted, the support member (32) that supports the first unit (26) and the second unit (28), the table (24) that supports the object to be machined, the relative movement mechanism (60, 62, 64) that causes the table (24) to move relative to the support member (32), the movement control unit (80) that controls the relative movement mechanism (60, 62, 64), the relative position detection unit (82) that detects the relative position of the table (24) with respect to the support member (32), and the distance calculation unit (84) that calculates the distance between the first unit (26) and the second unit (28), based on the relative position when the first unit (26) and the table (24) have arrived at the first relative positional relationship, and the relative position when the second unit (28) and the table (24) have arrived at the second relative positional relationship. In accordance with such features, the distance between the spindle (26X) of the first unit (26) and the holder of the second unit (28) can be easily acquired.

The distance calculation unit (84) may calculate the distance based on the relative position when the sensor (50) that is mounted on the table (24) has detected the first object to be detected (56) that is mounted on the first unit (26), and the relative position when the sensor (50) has detected the second object to be detected (58) that is mounted on the second unit (28). In accordance with such features, both the first object to be detected (56) and the second object to be detected (58) can be detected by the single sensor (50). Further, in the case that the cutting tool is the first object to be detected (56) and the lathe machining tool is the second object to be detected (58), the distance between the first unit (26) and the second unit (28) can be calculated even without changing the tools.

The distance calculation unit (84) may calculate the distance based on the relative position when the first sensor (50A) that is mounted on the first unit (26) has detected the object to be detected (90) that is mounted on the table (24), and the relative position when the second sensor (50B) that is mounted on the second unit (28) has detected the object to be detected (90). In accordance with such features, since the sensor need not be provided on the table (24) side, and further, a predetermined site on the table (24) can be used as the object to be detected (90), the work space of the table (24) is less likely to become restricted.

The support member (32) may be disposed on the column (22) that extends from the table (24) side in the direction intersecting the surface of the table (24), the second unit (28) may be arranged between the column (22) and the first unit (26), and the distance calculation unit (84) may calculate the distance in the direction along the surface, and the distance in the direction intersecting the surface. In accordance with such features, the distance between the first unit (26) and the second unit (28) can be calculated with high accuracy.

The invention claimed is:

1. A machine tool, comprising:
a bed;
a column extending upward from the bed;
a support member configured to be movable in an upper-lower direction with respect to the column;
a table configured to be movable with respect to the support member;
a cutting unit being supported by the support member and including a spindle on which a cutting tool is mounted wherein the cutting tool is configured to carry out a cutting process on an object to be machined that is supported on the table;
a turning unit being supported by the support member and on which a lathe machining tool is mounted wherein the lathe machining tool is configured to carry out a turning process on the object to be machined that is supported on the table;
a relative movement mechanism configured to cause the table to move relative to the support member;
a movement control unit configured to control the relative movement mechanism;
a relative position detection unit configured to detect a relative position of the table with respect to the support member; and
a distance calculation unit configured to calculate a distance between the cutting unit and the turning unit, based on the relative position when cutting unit and the table have arrived at a first relative positional relationship, and the relative position when the turning unit and the table have arrived at a second relative positional relationship.

2. The machine tool according to claim 1, wherein
the distance calculation unit calculates the distance based on the relative position when a sensor that is mounted on the table has detected a first object to be detected that is mounted on the cutting unit, and the relative position when the sensor has detected a second object to be detected that is mounted on the turning unit.

3. The machine tool according to claim 1, wherein
the distance calculation unit calculates the distance based on the relative position when a first sensor that is mounted on the cutting unit has detected an object to be detected that is mounted on the table, and the relative position when a second sensor that is mounted on the turning unit has detected the object to be detected.

4. The machine tool according to claim 1, wherein:
the turning unit is arranged between the column and the cutting unit; and
the distance calculation unit calculates the distance in a direction along the surface, and the distance in the direction intersecting the surface.

* * * * *